(12) United States Patent
Arbore et al.

(10) Patent No.: US 6,701,044 B2
(45) Date of Patent: Mar. 2, 2004

(54) SOLID STATE LASER GENERATING UV RADIATION FOR WRITING FIBER BRAGG GRATINGS

(75) Inventors: Mark A. Arbore, Los Altos, CA (US); Thomas J. Kane, Menlo Park, CA (US); Jeffrey D. Kmetec, Palo Alto, CA (US)

(73) Assignee: Lightwave Electronics, Mountain View, CA (US)

( * ) Notice: Subject to any disclaimer, the term of this patent is extended or adjusted under 35 U.S.C. 154(b) by 258 days.

(21) Appl. No.: 09/927,191

(22) Filed: Aug. 10, 2001

(65) Prior Publication Data

US 2003/0031411 A1 Feb. 13, 2003

(51) Int. Cl.$^7$ .................................. G02B 6/34
(52) U.S. Cl. ............................................ 385/37
(58) Field of Search ............................. 385/37

(56) References Cited

U.S. PATENT DOCUMENTS

| | | | |
|---|---|---|---|
| 5,367,588 A | 11/1994 | Hill et al. ................. | 385/37 |
| 5,394,413 A | 2/1995 | Zayhowski ................ | 372/10 |
| 5,483,546 A | 1/1996 | Johnson et al. ............ | 372/10 |
| 5,740,190 A | 4/1998 | Moulton .................... | 372/23 |
| 5,745,284 A | 4/1998 | Goldberg et al. .......... | 359/344 |
| 5,751,751 A | 5/1998 | Hargis et al. .............. | 372/41 |
| 5,909,306 A | 6/1999 | Goldberg et al. .......... | 359/341 |
| 5,940,568 A | 8/1999 | Losch ........................ | 385/129 |
| 6,185,236 B1 | 2/2001 | Eichenholz et al. ........ | 372/41 |
| 2003/0048523 A1 * | 3/2003 | Gerstenberger et al. .... | 359/328 |

OTHER PUBLICATIONS

J. Nilsson et al, "Ring–doped cladding–pumped single mode three level fiber laser", Sep. 30, 1997, Optical Society of American, pp. 355–357.

R. Salvas et al., "High–power, low noise, Yb–doped, cladding–pumped, three–level fiber sources at 980nm", Jul. 1, 2003. Optical Society of America, pp. 1093–1095.

J. R. Armitage et al, "Highly–Efficient 980nm Operation Of An Yb3+–Doped Silica Fibre Laser", Jan. 17, 1999, Electronics Letters, pp. 298–299.

A.S. Kurkov, "Efficient Yb fiber laser at 980 nm pumped by the high–brightness semiconductor source", May 1, 2001, Conference on Lasers and Electro–Optics. pp. 216–217.

A. Bayramian, et al., "Three–Level Q–Switched Laser Operation of Ytterbium–Doped $Sr_5(PO_4)_3F$ at 985nm," Opt. Lett. vol. 25, No. 9, p. 622–625, May 1, 2000.

\* cited by examiner

*Primary Examiner*—James Davie
(74) *Attorney, Agent, or Firm*—Lumen Intellectual Property Services, Inc.

(57) ABSTRACT

A system employing a solid state light source for writing Bragg gratings in fibers and for other photolithographic applications. The solid state light source preferably has a passively Q-switched laser, a fiber amplifier and two or more nonlinear conversion elements for delivering a pulsed exposure beam at an exposure wavelength in the UV wavelength range. The exposure beam is generated in a single pass through the nonlinear elements, for example by cascaded second harmonic generation yielding the fourth harmonic. The system is effective at covering the UV wavelengths from 200 nm to 330 nm and particularly effective at producing an exposure wavelength between 240 and 250 nm at average power levels of 500 milliWatts and more within a photosensitive range of fiber cores in which Bragg gratings are to be written.

11 Claims, 6 Drawing Sheets

SOLID STATE LASER GENERATING UV RADIATION FOR WRITING FIBER BRAGG GRATINGS

RELATED APPLICATIONS

This application is related to application entitled "Compound Light Source Employing Passive Q-switching and Nonlinear Frequency Conversion" and application entitled "Pulse Sequencing for Generating a Color Image in Laser-Based Display Systems", both of which are being filed on the same day as this application.

FIELD OF THE INVENTION

The present invention relates generally to solid state light sources employing lasers with passive Q-switches and nonlinear frequency converters to generate light in the UV wavelength range for writing Bragg gratings and for other photolithographic applications.

BACKGROUND OF THE INVENTION

Fiber Bragg gratings are quietly revolutionizing modern telecommunication systems and are enabling new types of optical fiber sensors which have the potential to displace equivalent electrical sensor devices. Therefore, it is important to develop suitable apparatus and methods for producing Bragg gratings efficiently and reliably.

Typically, Bragg gratings are written in a photosensitive core of a fiber by illuminating it with an exposure beam at a UV wavelength within a photosensitive range of the core. For example, a Bragg grating is written in a core containing an oxygen deficient matrix in glass (e.g., the core has germanium oxygen deficient centers). Such matrix is highly photosensitive in a range between 240 to 250 nm, where it has an absorption band peaking at about 242 nm. Hence, most commonly employed source of radiation in the UV wavelength range have exposure wavelengths between 240 and 250 nm.

At present, methods for writing Bragg gratings include interferometric techniques, phase mask techniques and point-by-point techniques. There are many variants for each of these three methods, and each requires a suitable light source for generating an exposure beam in the UV wavelength range. Among the most common light source employed for writing Bragg gratings are UV laser sources such as frequency-doubled optical parametric oscillators, narrowed-linewidth 248 nm KrF excimer lasers, intracavity frequency-doubled Argon ion lasers, frequency doubled Ca vapor lasers, frequency quadrupled Nd:YAG lasers. Meanwhile, frequency-doubled optical parametric oscillators pumped by a frequency tripled Q-switched Nd:YAG laser have been used to make fiber Bragg gratings, but such systems tend to be complex and expensive. We note that such systems can be all-solid-state and diode-pumped.

Besides writing Bragg gratings, many materials processing applications include a photolithographic step during which a processed material is exposed to UV radiation. The light sources used for the exposure should be stable, efficient and spectrally pure high-power light sources. For efficient exposure the power level of such light sources should be in the range of several hundred milliWatts and more, e.g., 1 Watt or more. Furthermore, such light sources should be inexpensive to produce and they should generate light in the appropriate portion of the UV wavelength range between 200 nm and 330 nm.

Currently, the most commonly used sources of UV radiation for photolithographic applications such as processing of semiconductor wafers employ excimer lasers of various wavelengths. Excimer lasers at 248 are also the most commonly used UV sources for producing fiber Bragg gratings. Meanwhile, frequency doubled Argon laser emitting at 488 nm (yielding an exposure wavelength of 244 nm) provides the best performance for producing fiber Bragg gratings. Unfortunately, this source is very bulky, cumbersome and expensive to use. For more general information on photolithography using UV radiation the reader is referred to U.S. Pat. No. 5,367,588 to Hill et al. and to U.S. Pat. No. 5,940,568 to Losch et al. addressing the application of photolithographic methods as applied to writing Bragg gratings in fibers.

The prior art teaches various types of light sources for generating light in the visible and UV ranges. A number of these sources rely on a nonlinear frequency conversion operation such as second harmonic generation (SHG) to transform a frequency outside the visible range, e.g., in the IR range, to the desired deep blue or UV frequency. For example, U.S. Pat. No. 5,751,751 to Hargis et al. teaches the use of SHG to produce deep blue light. Specifically, Hargis et al. use a micro-laser which has a rare earth doped microlaser crystal and emits light at about 914 nm to drive SHG in a crystal of BBO producing output at about 457 nm.

U.S. Pat. No. 5,483,546 to Johnson et al. teaches a sensing system for high sensitivity spectroscopic measurements. This system uses a passively Q-switched laser emitting light at a first frequency. The light from the laser is transmitted through a fiber and converted to output light at a second frequency in the UV range. The conversion is performed by two frequency doubling crystals disposed far away from the Q-switched laser.

U.S. Pat. No. 6,185,236 to Eichenholz et al. teaches a self frequency doubled Nd:doped YCOB laser. The laser generates light of about 400 mW power at about 1060 nm and frequency doubles it with the aid of a frequency doubling oxyborate crystal to output light in the green range at about 530 nm. Eichenholz et al. combine the active gain medium and the frequency doubler in one single element to produce a compact and efficient light source.

In U.S. Pat. Nos. 5,745,284 and 5,909,306 Goldberg et al. teach a solid-state spectrally pure pulsed fiber amplifier laser system for generating UV light. This system has a fiber amplifier in a resonant cavity and an acousto-optic or electro-optic modulator incorporated into the cavity for extracting high-peak-power, short-duration pulses from the cavity. These short pulses are then frequency converted in several non-linear frequency conversion crystals (frequency doubling crystals). The addition of the modulator into the cavity for extracting the pulses and placement of the fiber amplifier within the resonant cavity renders this system very stable and capable of delivering a spectrally-pure pulse. Unfortunately, this also makes the system cumbersome and expensive.

U.S. Pat. No. 5,740,190 to Moulton teaches a three-color coherent light system adapted for image display purposes. This system employs a laser source and a frequency doubling crystal to generate green light at 523.5 nm. Moulton's system also generates blue light at 455 nm and red light at 618 nm by relying on frequency doubling and the nonlinear process of optical parametric oscillation.

Q-switched lasers operating on the 3-level ~980 nm transition of Yb have been demonstrated. For example, in 'Three-level Q-switched laser operation of ytterbium-doped $Sr_5(PO_4)_3F$ at 985 nm' (A. Bayramian, et. al., Opt. Lett. Vol 25, No. 9, Pg. 622–625, May 1, 2000) the authors showed that Yb:SFAP can be Q-switched on this transition, however they had to resort to a complex and inefficient pumping scheme. The authors point out the usefulness of the $2^{nd}$ and $3^{rd}$ harmonic of this laser wavelength, but fail to identify the $4^{th}$ harmonic at 246 nm as attractive. Additionally, they do not indentify writing of fiber Bragg gratings or other photolithographic applications.

Unfortunately, the light sources described above and various other types of light sources taught by the prior art can not be employed to make stable, low-cost, efficient sources of light delivering UV radiation of sufficient power for writing Bragg gratings and other photolithographic applications. This is in part due to the fact that frequency conversion, e.g., frequency doubling in crystals, is not a very efficient operation. If the frequency doubling crystal had extremely high non-linearity, then low power continuous wave (cw) lasers could be efficiently doubled to generate output power levels near 1 Watt. However, in the absence of such frequency doubling crystals high-peak-power, short pulse lasers are necessary to obtain frequency doubled light at appreciable power levels. It should also be noted that providing such high-peak-power short pulses adds complexity to the design of the light sources and introduces additional costs.

U.S. Pat. No. 5,394,413 to Zayhowski addresses the issue of efficient frequency doubling by using a passively Q-switched picosecond microlaser to deliver the pulses of light. Such pulses can be efficiently converted, as further taught by Zayhowski in a frequency-doubling crystal. Devices built according to Zayhowski's teaching operate at relatively low average power levels and low repetition rates. Attempts to increase these parameters by pumping the microchip harder will cause multiple transverse-mode operation leading to degradation of beam quality and will also incur increased pulse-to-pulse noise.

Hence, what is needed is a stable and efficient source of light in the UV range which can be used for writing Bragg gratings and for other photolithographic applications.

OBJECTS AND ADVANTAGES

It is therefore a primary object of the present invention to provide a stable, low-cost and efficient light source generating light in the UV wavelength range appropriate for writing Bragg gratings. More specifically, it is an object of the invention to provide such solid state light sources capable of an average power output of several hundred milliWatts, and preferably 1 Watt or more which can be used for writing Bragg gratings in fibers and for other photolithographic applications.

These and other objects and advantages of the invention will become apparent upon further reading of the specification.

SUMMARY

The objects and advantages are achieved by a solid state laser source for writing a Bragg grating in a fiber and for other photolithographic applications. The solid state laser source has a mechanism which uses a fiber amplifier for generating a pulsed exposure beam at an exposure wavelength in a UV wavelength range within a photosensitive range of a core of the fiber. The solid state laser source is further equipped with an arrangement for delivering the pulsed exposure beam to the fiber such that the Bragg grating is created in the core. The exposure wavelength is between 240 and 250 nm and preferably between 242 and 245 nm.

The mechanism for generating the pulsed exposure beam preferably has a passively Q-switched laser, the fiber amplifier and at least one frequency conversion element. In one embodiment the frequency conversion is performed by two second harmonic generators set up in series. These two second harmonic generators produce the pulsed exposure beam which corresponds to the fourth harmonic of a pulsed intermediate beam emitted from the passively Q-switched laser. The frequency conversion is performed in a single pass.

The mechanism for generating the pulsed exposure beam preferably has a Yb doped laser emitting at a wavelength between 960 and 990 nm. The Yb doped laser can be a Q-switched laser and preferably a passively Q-switched laser. The Yb doped laser can also be a Q-switched fiber laser. The actual wavelength at which the Yb doped laser emits depends, as is known by those skilled in the art, on the host in which Yb is contained. The Yb doped laser can be a Yb:glass, Yb:YAG, Yb:YLF, Yb:YALO, Yb:FAP, Yb:SFAP, $Yb:KY(WO_4)_2$, Yb:ZBLAN. Additional materials which are suitable for use can be found in the open literature and the reader is referred to L. DeLoach et al., "Evaluation of Absorption and Emission Properties of Yb3+ Doped Crystals for Laser Applications", IEEE Journal of Quantum Electronics, Vol. 29, No. 4, April 1993, pp. 1179-91 for such materials. The preferred materials, due to good overlap between the lasing wavelength and the gain wavelength of Yb-doped germanosilicate optical fiber, are Yb:YLF, Yb:YALO, Yb:FAP, Yb-doped phosphate glass, and other Yb-doped glasses.

In another embodiment the mechanism for generating the pulsed exposure beam has a pulsed diode laser emitting at a wavelength of about 980 nm. The mechanism is further equipped with at least one Yb doped fiber. This fiber can be used for amplifying the output of the pulsed laser diode. In this embodiment the mechanism also has a fourth harmonic generator e.g., in the form of two second harmonic generators set up in series to produce the fourth harmonic of the wavelength emitted by the pulsed diode laser in a single pass.

In yet another embodiment of the invention the solid state laser source has a Yb doped element for emitting the beam at a wavelength of about 980 nm and the fourth harmonic generator for converting that beam to an exposure beam at an exposure wavelength. The exposure wavelength is between 240 and 250 nm, and preferably between 242 and 245 nm. The exposure beam is delivered to the fiber for exposing its core to write the Bragg grating. The Yb doped element can be a pulsed Yb doped element emitting a pulsed beam. In this case, the exposure beam will be a pulsed exposure beam.

The Yb doped element can be a Yb doped laser. Preferably, the Yb doped laser is a Q-switched laser or a Q-switched fiber laser. The Yb doped laser is most preferably a passively Q-switched laser. A fiber amplifier, e.g., in the form of a Yb doped fiber, is used to amplify the output of the Yb doped laser prior to frequency conversion in the fourth harmonic generator.

In one embodiment of a method according to the invention a Bragg grating is written in the core of a fiber. This method calls for providing the solid state laser source with a fiber amplifier, deriving from the source a pulsed exposure beam at the exposure wavelength in the UV wavelength range in a photosensitive range of the core, and exposing the core with the pulsed exposure beam. The exposure can be performed in accordance with an interferometric technique, a phase mask technique or a point-by-point technique. The exposure wavelength is between 240 and 250 nm, and preferably between 242 and 245 nm, since this covers the absorption peak of the core. Specifically, it is preferable that the fiber selected for writing the Bragg grating have an enhanced photosensitivity, e.g., as compared to the SMF 28 fiber standard. The enhanced photosensitivity means that the core has a higher response to the radiation at the exposure wavelength and the Bragg grating can thus be written more rapidly and efficiently.

In another method of the invention a Yb doped element is selected for emitting a beam at a wavelength of about 980 nm. The fourth harmonic at an exposure wavelength is generated by a fourth harmonic generator from this beam. The resulting exposure beam is used for exposing the core. The Yb doped element can be selected to emit a pulsed beam, thereby rendering the exposure beam pulsed.

As will be apparent to a person skilled in the art, the invention admits of a large number of embodiments and versions and can be employed for any photolithographic technique. The below detailed description and drawings serve to further elucidate the invention and its operation.

DETAILED DESCRIPTION

Figure 1A:
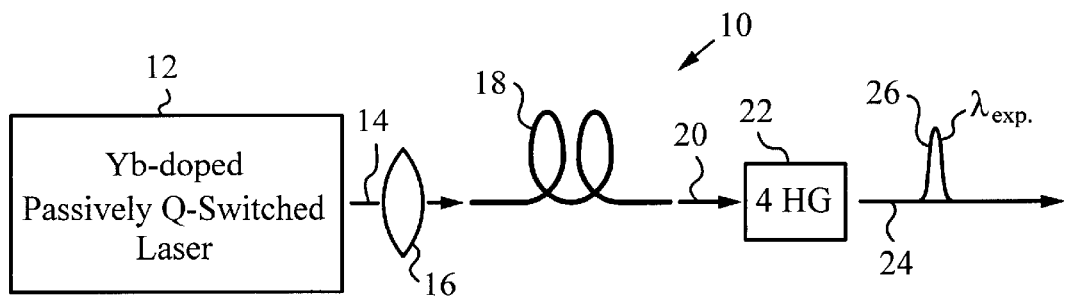
FIGS. 1A–D are block diagrams illustrating a preferred solid state light source and three alternative solid state light sources for writing Bragg gratings and other photolithographic applications.

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

The block diagrams of FIG. 1 illustrate the general structure of several solid state light sources according to the invention for writing Bragg gratings and for other photolithographic applications requiring radiation in the UV wavelength range. FIG. 1A is a general block diagram of a solid state light source 10. Light source 10 has a Yb doped element 12, in particular a Yb:glass, Yb:YLF, Yb:YALO, Yb:FAP laser emitting at a wavelength near 980 nm. Yb:glass, Yb:YLF, Yb:YALO, Yb:FAP laser 12 is passively Q-switched and thus emits a pulsed beam 14. Light source 10 is further equipped with a beam guiding element 16, here in the form of a lens, for in-coupling pulsed beam 14 into a fiber amplifier 18. Fiber amplifier 18 is a Yb doped fiber amplifier for amplifying pulsed beam 14 to obtain a pulsed intermediate beam 20 with sufficiently high pulse peak powers to obtain efficient single pass frequency conversion.

A fourth harmonic generator 22 is positioned in the path of pulsed intermediate beam 20. Fourth harmonic generator 22 converts the wavelength of intermediate beam 20 and emits a pulsed exposure beam 24 at an exposure wavelength $\lambda_{exp.}$ in the UV wavelength range. Specifically, fourth harmonic generator 22 converts the wavelength near 980 nm to exposure wavelength of $\lambda_{exp.}$=245 nm. Exposure beam 24 consists of pulses 26 (only one is shown for clarity) yielding sufficient average power for writing Bragg gratings or for other lithographic applications. The average power can be regulated by controlling the duty cycle of pulsed beam 14 emitted by Yb-doped element 12 and the amount of amplification in fiber amplifier 18. For example, exposure beam 24 has a few hundred milliWatts of average power, and preferably 500 milliWatts or more.

Figure 1B:
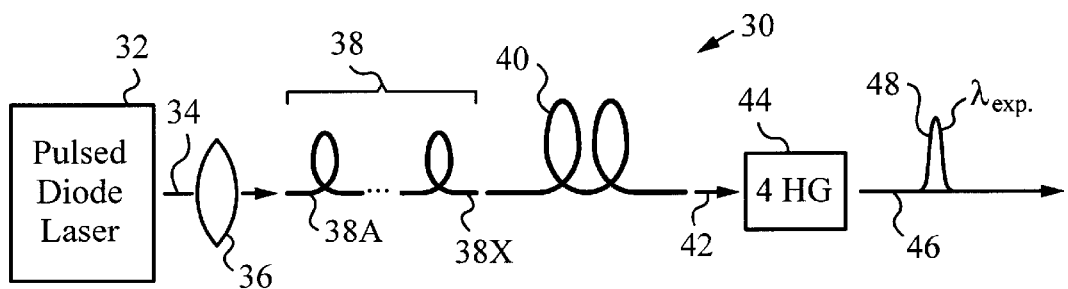

FIG. 1B is a general block diagram of another solid state light source 30. Light source 30 has a pulsed diode laser 32 emitting at a wavelength of about 980 nm. Laser 32 is appropriately pulsed by suitable controls (these are well-known in the art and are not shown) to generate a pulsed beam 34. Light source 30 is further equipped with a beam guiding element 36, in this case a lens, for in-coupling pulsed beam 34 into a series of fiber pre-amplifiers 38, of which a first is referenced by 38A and a last by 38X. Two, three or more fiber pre-amplifiers 38 are used to increase the peak pulse powers emitted in pulsed beam 34 from laser 32.

Fiber pre-amplifiers 38 are followed by a fiber amplifier 40, preferably a Yb doped fiber amplifier. Fiber amplifier 40 amplifies pre-amplified pulsed beam 34 to produce a pulsed intermediate beam 42 with sufficiently high peak pulse powers to obtain efficient single pass frequency conversion in a fourth harmonic generator 44. Fourth harmonic generator 44 emits a pulsed exposure beam 46 consisting of pulses 48 (only one indicated) at an exposure wavelength $\lambda_{exp.}$ of about 245 nm. The average power of exposure beam 46 is a few hundred milliWatts and preferably higher.

Figure 1C:
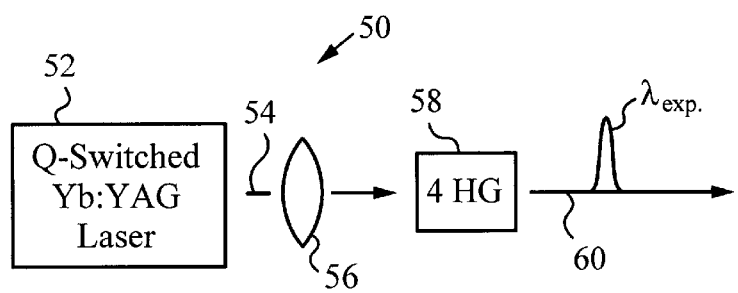

FIG. 1C illustrates a general block diagram of a solid state light source 50 using a Q-switched Yb:YAG laser 52 to deliver a pulsed beam 54 with high peak power pulses. A beam guiding element 56 is used to couple pulsed beam 54 directly into a fourth harmonic generator 58 for producing a pulsed exposure beam 60 in a single pass. Pulsed exposure beam 60 contains pulses 62 (only one indicated) and its average power is a few hundred milliWatts and preferably more. Exposure wavelength $\lambda_{exp.}$ is equal to 242 nm when the Yb:YAG transition at 968 nm is used for generating pulsed beam 54. Alternatively, when using a Q-switched Yb:SFAP laser as laser 52 in the same arrangement and driving the Yb:SFAP transition at 985 nm the exposure wavelength $\lambda_{exp.}$ is equal to 246 nm.

Figure 1D:
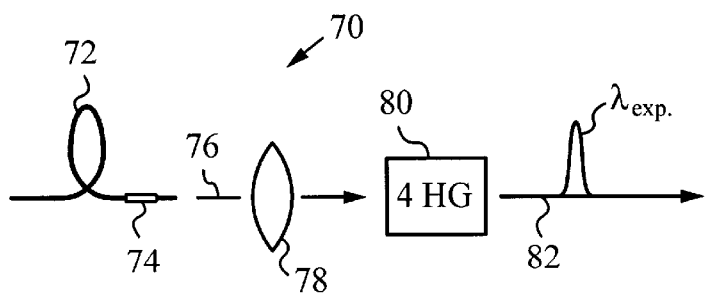

FIG. 1D illustrates a general block diagram of a solid state light source 70 employing a fiber laser 72 with a Q-switch 74 to deliver a pulsed beam 76. Fiber laser 72 is a Yb doped fiber laser emitting at a wavelength between 960 and 990 nm (depending on the host material) and Q-switch 74 is a passive Q-switch. A beam guiding element 78 is used to couple pulsed beam 76 directly into a fourth harmonic generator 80 to produce a pulsed exposure beam 82 at exposure wavelength $\lambda_{exp}$ between 240 and 250 nm and preferably between 242 and 245 nm.

Figure 2:
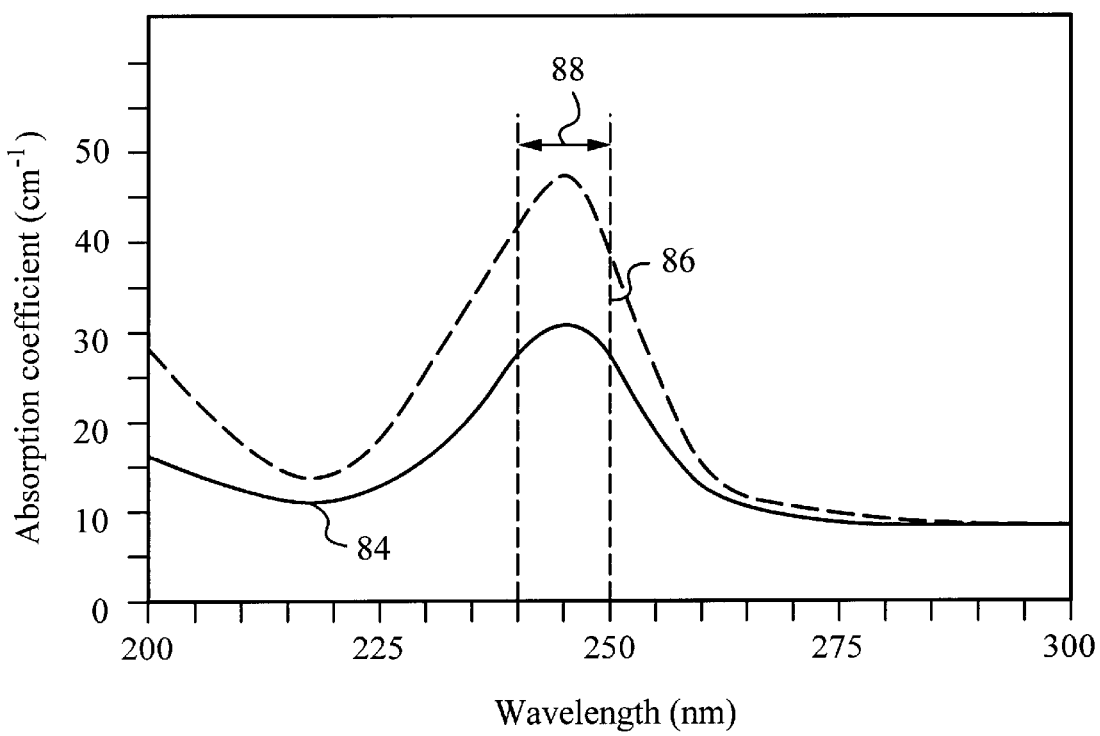
FIG. 2 is a graph illustrating the photosensitive range of a fiber with a photosensitive core wherein a Bragg grating is to be written.

In order to write Bragg gratings, the exposure wavelength $\lambda_{exp}$ has to be within a certain UV wavelength range where the core of the fiber exhibits sufficient photosensitivity. FIG. 2 shows an absorption spectrum 84 of a germanosilicate glass fiber and an absorption spectrum 86 of the same fiber further sensitized by loading with hydrogen. Still further improvements in absorption leading to higher photosensitivity of the core can be obtained by heating and exposure to $CO_2$ as well as other methods known in the art. Both absorption spectra 84, 86 have peaks between 240 and 250 nm. Hence, the core exhibits a photosensitive range 88 between 240 and 250 nm. In fact, although the photosensitive range of a core of germanosilicate fiber extends about the absorption peak between 240 and 250 nm any other absorption peak where the core of the fiber to be impressed with a Bragg grating exhibits sufficiently high photosensitivity can be selected as the photosensitive range.

A person skilled in the art will appreciate that the general architectures of solid state light sources shown in FIG. 1 can be used to derive other similar solid state light sources. This can be done by substituting materials for lasants and hosts as well as exchanging fiber types and adjusting pulse formats. It is also possible to adapt the solid state light source to be operated in continuous wave (cw) mode, e.g., light source 30 can be operated without pulsing. For writing Bragg gratings in germanosilicate glass fibers the exposure wavelength of these sources should be within the photosensitive range between 240 and 250 nm. Most preferably, exposure wavelength should be kept close to the very absorption peak between 242 and 245 nm. More detailed information about specific designs of solid state light sources is provided below.

Figure 3:
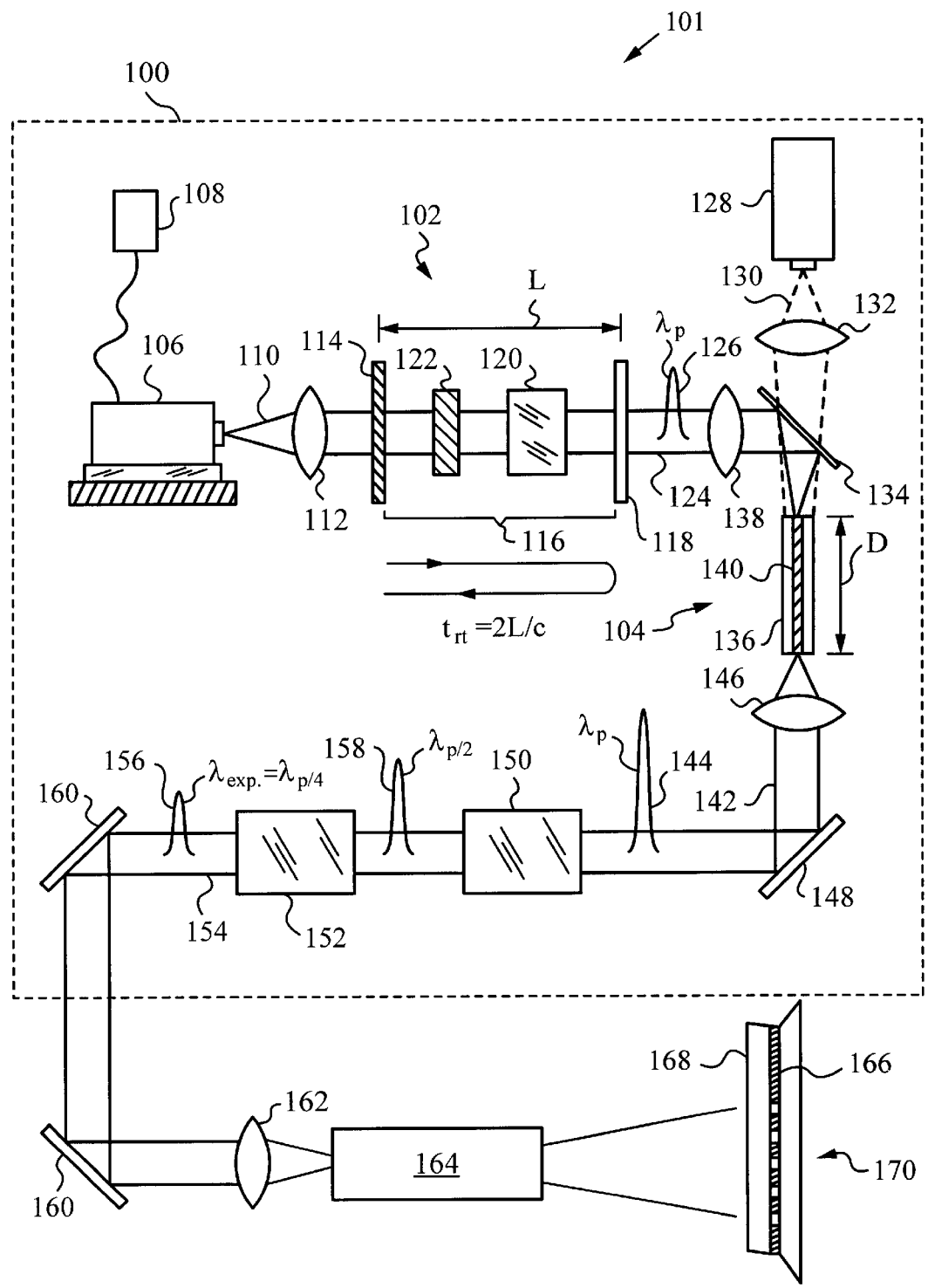
FIG. 3 is a detailed diagram of the preferred solid state light source employed in writing Bragg gratings according to the invention.

FIG. 3 is a detailed diagram of a preferred solid state light source 100 employed in a system 101 for writing Bragg gratings according to the invention. Light source 100 has a passively Q-switched laser 102 and a fiber amplifier 104. Light source 100 has a pump source 106 for producing pump light 110. In this embodiment, pump source 106 is a semiconductor laser equipped with a wavelength tuning mechanism 108. Laser 106 is designed to deliver pump light 110 in the form of a continuous wave (cw) light beam. Many types of lasers are suitable for use as pump source 106. In the present application, it is preferable to pump Q-switched laser 102 with semiconductor laser 106 at 905–965 nm with pump light 110 intensity on the order of 1,000 Watts per square millimeter. The actual wavelength of pump light 110 should be adjusted based on the type of gain medium 120 used by Q-switched laser 102. When using Yb-doped materials as medium 120 the most convenient wavelengths of pump light 110 are 905 nm for Yb:FAP, 962 nm for Yb:YALO, 940 nm for Yb:YLF, 915 nm for $Yb:SiO_2$, 915–940 nm for Yb-doped phosphate glass.

A lens 112 is provided before pump source 106 for focusing pump light 110 and directing it to an input coupler 114 of Q-switched laser 102. Input coupler 114 is designed to admit pump light 110 into a cavity 116 of passively Q-switched laser 102. Cavity 116 has a length L defined between input coupler 114 and an output coupler 118. Although in the present embodiment cavity 116 is linear and couplers 114, 118 are in the form of mirrors, a person skilled in the art will appreciate that other types of cavities and coupling elements can be used.

Gain medium 120 is contained inside cavity 116. Gain medium 120 exhibits a high amount of gain per unit length when pumped with pump light 110. Typically, high gain is achieved by providing a high doping level in gain medium 120 within the cross section traversed by light 110. Doped materials with suitable amounts of gain to be used as gain medium 120 include Yb:YAG, Yb:glass, Yb:YLF, Yb:YALO, Yb:FAP, Yb:SFAP, $Yb:KY(WO_4)_2$, Yb:ZBLAN and other Yb doped hosts or lasants such as Nd and hosts. It is also convenient that light 110 stimulate the 980 nm transition in Yb when using Yb doped materials. A person skilled in the art will be familiar with other suitable dopants and host materials as well as the corresponding transitions.

Cavity 116 also contains a passive variable loss element or passive Q-switch 122. Preferably, passive Q-switch 122 is a saturable absorber Q-switch such as chromium:YAG, which functions in the wavelength range from 860 nm to 1100 nm. Alternatively, semiconductors or semiconductor material structured to act as a mirror can be used as passive Q-switch 122. Passive Q-switch 122 is adjusted for switching on and off such that, when subjected to cw pumping by pump light 110, passively Q-switched laser 102 generates a pulsed beam 124 at a wavelength $\lambda_p$. For clarity, only a single pulse 126 of primary beam 124 exiting cavity 116 through output coupler 118 is indicated in FIG. 3. Wavelength $\lambda_p$ corresponds to the selected transition of gain medium 30; in the present case it is the 980 nm transition in Yb.

Light source 100 also has a pump source 128 for supplying a pump light 130. Source 128 can be a diode laser operating in the wavelength range from 910 nm to 930 nm and delivering about 1,000 Watts per square millimeter. Preferably, source 128 is fiber coupled laser such as a LIMO type laser (available from LIMO Laser Systems, laser@limo.de) or another semiconductor laser. A lens 132 and a beam combiner 134 are positioned in the path of pump light 130. Lens 132 focuses pump light 130 such that it is in-coupled into fiber amplifier 104. In particular, with the aid of lens 132 pump light 130 is in-coupled into a cladding 136 of fiber amplifier 104. A lens 138 is also positioned in the path of beam 124 before beam combiner 134. Lens 138 focuses beam 124 such that after being combined with pump light 130 by beam combiner 134, primary beam 124 is in-coupled into a core 140 of fiber amplifier 104.

Fiber amplifier 104 produces a pulsed intermediate beam 142 at wavelength $\lambda_p$ from beam 124. Preferably, pulsed intermediate beam 142 exhibits high peak power, e.g., in the range of 10,000 Watts in each pulse 144 (only one pulse shown for reasons of clarity). To achieve such high peak power fiber amplifier 104 has a short length D, e.g., D is on the order of 2 meters, so as to suppress stimulated Raman scattering (SRS). In addition, to achieve efficient absorption of pump light 130 in core 140 over such short length D, cladding 136 is preferably small, e.g., between 50 $\mu$m and 100 $\mu$m in diameter. Furthermore, core 140 is preferably large, e.g., between 5 $\mu$m and 10 $\mu$m in diameter, and exhibits a high doping level, e.g., 0.5% or more. A person skilled in the art will appreciate that any appropriate dopant can be used for doping core 140 to amplify beam 124 based on wavelength $\lambda_p$. Preferably, fiber amplifier 104 is a glass fiber doped with Yb ions. A person skilled in the art will also recognize that to obtain efficient amplification at wavelength $\lambda_p$ ranging between 960 and 980 nm it may be necessary to provide fiber amplifier 104 with suitable filtering characteristics (e.g., to suppress gain at the four level transition at 1064 nm). Patent application Ser. No. 09/825,148 entitled "Optical Wavelength Filtering Apparatus with Depressed-Index Claddings" and filed on Apr. 2, 2001 discusses suitable methods for achieving such filtering characteristics.

A lens 146 and a beam guiding element 148, in this case a mirror, are positioned in the path of pulsed intermediate beam 142. Lens 146 shapes pulsed intermediate beam 142 and element 148 deflects it such that beam 142 is in-coupled into two nonlinear elements 150, 152 positioned in series after fiber amplifier 104. Nonlinear elements 150, 152 are designed to frequency convert pulsed intermediate beam 142 in a single pass to a pulsed exposure beam 154 at an exposure wavelength $\lambda_{exp.}$ in the UV wavelength range. Only one output pulse 156 of exposure beam 154 is illustrated for clarity.

In the present embodiment, nonlinear elements 150, 152 are nonlinear optical crystals both for generating the second harmonic of the input wavelength. Thus, first crystal 150 converts wavelength $\lambda_p$ to half the wavelength, $\lambda_{p/2}$=490 nm, and second crystal 152 converts $\lambda_{p/2}$ to the exposure wavelength $\lambda_{exp.}$ at the fourth harmonic of the original wavelength, i.e., $\lambda_{exp.}=\lambda_{p/4}$. The conversion process of second harmonic generation (SHG) is well-known in the art. In the present embodiment, wavelength $\lambda_p$ is 980 nm and thus exposure wavelength $\lambda_{p/4}$=245 nm.

Preferably, optical crystals used as nonlinear elements 150, 152 belong to the borate family. For example, first crystal 150 is LBO and second crystal 152 is BBO or CLBO. Furthermore, any appropriate phase matching technique known in the art is employed to ensure efficient second and fourth harmonic generation in crystals 150, 152.

System 101 is further equipped with optics 160 and 162 for delivering pulsed exposure beam 154 to an grating exposure device 164. Grating exposure device 164 receives exposure beam 154 and uses it to produce a grating pattern of a Bragg grating 170 which is to be written in a core 166 of a fiber 168. Device 164 can employ any suitable technique known in the art to create and illuminate core 166 with the pattern. For example, exposure can be performed in accordance with an interferometric technique, a phase mask technique, a point-by-point technique or any other suitable technique. Most popular techniques are well known in the art and the reader is referred to Andreas Othonos and Kyriacos Kalli, "Fiber Bragg Gratings: fundamentals and applications in telecommunications and sensing", Chapter 4, 1999, Artech House, Inc. for further information.

During operation, pump source 106 is tuned by mechanism 108 to generate pump light 110 in the form of a cw beam at the requisite wavelength to pump gain medium 120. Passively Q-switched laser 102 is adjusted such that pulses 126 of output beam 124 are controlled. To achieve this, one notes that a round-trip time, $t_{rt}$, of cavity 116 is related to length L of cavity 116 by the equation:

$$t_{rt} = \frac{2L}{c},$$

where c is the speed of light. Hence, round-trip time $t_{rt}$ can be set by selecting length L of cavity 116. Meanwhile, passive Q-switch 122, in this case saturable absorber Q-switch is adjusted by setting its inter-pulse time. This is done by choosing the appropriate saturable loss, $q_o$, of the absorbing material and using the fact that the repetition rate of passive Q-switch 122 is typically proportional to pump power or the power level of pump light 110. A person skilled in the art will know how to adjust these parameters to obtain the appropriate inter-pulse time and will also find additional teachings provided by G. J. Spühler et al., "Experimentally Confirmed Design Guidelines for Passively Q-Switched Microchip Lasers Using Semiconductor Saturable Absorbers", J. Opt. Soc. Am. B, Vol. 16, No. 3, March 1999, pp. 376–388 and other sources.

Figure 4:
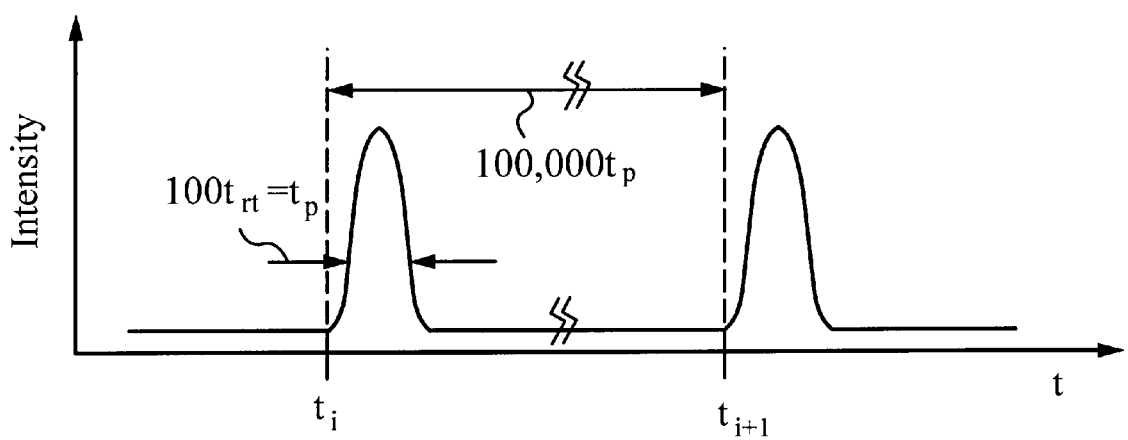
FIG. 4 is a timing diagram illustrating pulse timing in the solid state light source of FIG. 3.

In a preferred embodiment, length L is very short, e.g., L is on the order of 10 millimeters or less. Preferably, L is even less than 1 millimeter. The inter-pulse time of passive Q-switch 122 is selected such that pulses 126 have a pulse duration $t_p$ of about 100 times round-trip time $t_{rt}$ as illustrated in FIG. 4. In addition, passive Q-switch 122 is also set such that the time between successive pulses 126 at times $t_i$ and $t_{i+1}$ defining an interpulse separation is at least 100 times pulse time $t_p$ and preferably up to 10,000 times pulse time $t_p$. Thus, in the preferred embodiment, pulses 126 have a duty cycle ranging from 0.01% to 1%. For example, it may be convenient to use pulse formats such as 10 ns pulse time at 100 kHz repetition rate yielding a 0.1% duty cycle or 1 ns pulse time at 500 kHz repetition rate yielding a 0.2% duty cycle.

Pulses 126 exiting passively Q-switched laser 102 should preferably have a peak power level of at least 10 Watts and preferably between 50 and 500 Watts. Peak powers as high as 5 kW are routinely available from passively Q-switched lasers at 1064 nm. When pulses 126 enter fiber amplifier 104, which has a gain of about 100 or more (e.g., between 50 and 500) they are amplified to form intermediate pulses 144 with over 1,000 Watts and preferably over 10,000 Watts of peak power while preserving primary pulse timing as described above. At this power level and timing, intermediate pulses 144 have a pulse format which is above a nominal nonlinear frequency conversion threshold for SHG in nonlinear elements 150 and 152. Specifically, for the purposes of this description, nominal nonlinear frequency conversion threshold is defined to correspond to a pulse conversion efficiency of at least 10% and up to 50% and more in first nonlinear element 150. LBO crystal 150 has a length of 20 mm and CLBO crystal 152 has a length of 10 mm. Thus, at 10,000 Watts of peak power and 10 Watts of average power (0.1% duty cycle) of intermediate pulses 144 and approximately 50% efficient conversion to $\lambda_{p/2}$ one obtains 5000 Watts of peak power and 5 Watts average power at ~490 nm. Then, after passing through second element 152 output pulses 156 will yield about 0.5 Watts of average power and 500 Watts of peak power at $\lambda_{exp.}$=245 nm.

Since the actual photolithographic application of system 101 is the writing of Bragg gratings, the average power of 0.5 Watts and 1 Watt is sufficient, although higher power can be used. Using system 101 Bragg grating 170 is efficiently written in core 166 of germanosilicate glass fiber 168 with photosensitive range between 240 and 250 nm.

Figure 5A:
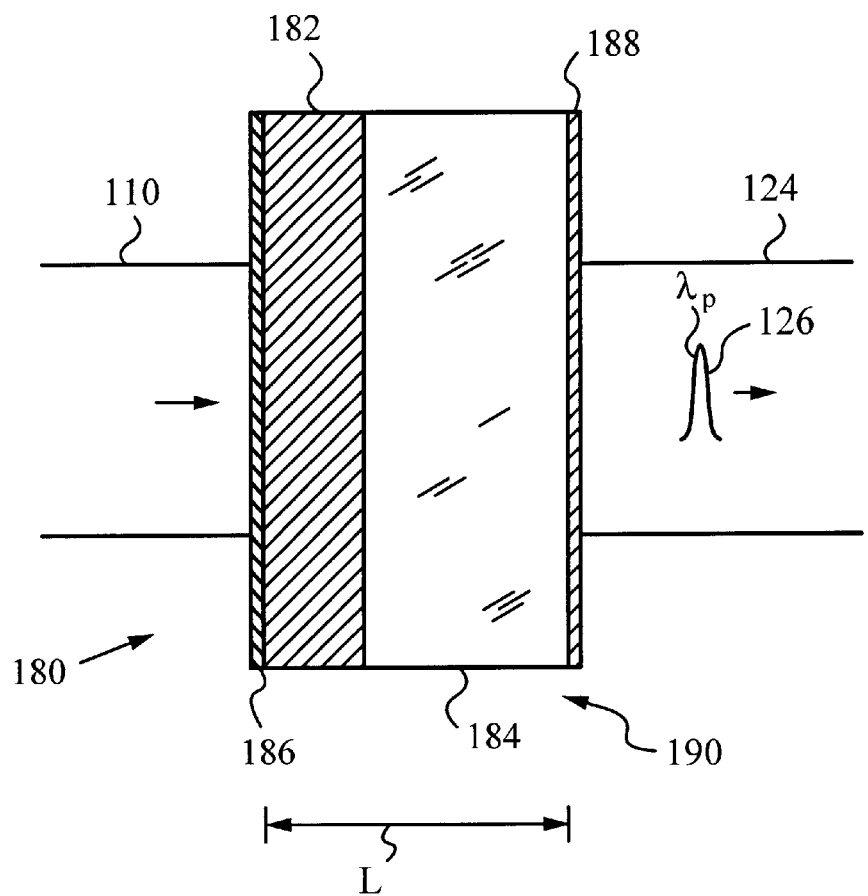
FIG. 5A is a detailed cross sectional view of a particular Q-switched laser suitable for use in a solid state light source according to the invention.

Light source 100 is a compound source with a number of elements requiring proper alignment and positioning. Several components of light source 100 can be simplified to reduce the complexity and cost of light source 100. FIG. 5A illustrates a preferred embodiment of a passively Q-switched laser 180 for light source 100. Laser 180 consists of a thin plate of saturable absorber 182 serving as the passive Q-switch and of a thin plate of gain medium 184. Saturable absorber 182 is bonded or otherwise attached to gain medium 184. It is also possible to align the plates of saturable absorber 182 and gain medium 184 in parallel and in close proximity. In this event the facing surfaces of the plates should be coated for low reflection.

A first mirror 186 and a second mirror 188 are deposited directly on the external surfaces of the plates of saturable absorber 182 and gain medium 184. First mirror 186 is an input coupler and admits pump light 110 into laser 180. Second mirror 188 is an output coupler, and serves for coupling out primary pulses 126 of pulsed primary beam 124. Mirrors 186 and 188 define a resonant cavity 190 of length L, which is short, e.g., on the order of 1 mm or less. Laser 180 is sometimes referred to as a microchip laser in the art. For further information on design guidelines for microchip lasers the reader is again referred to G. J. Spühler et al., "Experimentally Confirmed Design Guidelines for Passively Q-Switched Microchip Lasers Using Semiconductor Saturable Absorbers", J. Opt. Soc. Am. B, Vol. 16, No. 3, March 1999, pp. 376–388.

Figure 5B:
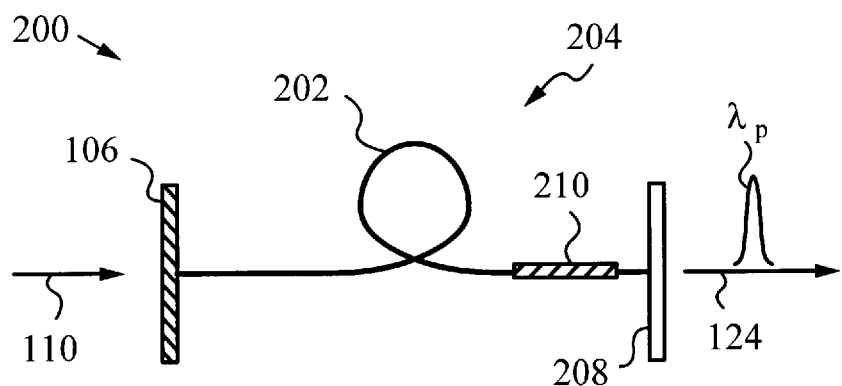
FIG. 5B is a diagram of another Q-switched laser suitable for use in a solid state light source according to the invention.

FIG. 5B illustrates another embodiment of a passively Q-switched laser 200 for light source 100. Laser 200 has a gain fiber 202 disposed in a resonant cavity 204. Resonant cavity 204 is defined between a mirror 206 for in-coupling pump light 110 and a mirror 208 for out-coupling pump beam 124. Although cavity 204 is defined by mirrors 206, 208 in this case, gratings or coatings placed near the end of gain fiber 202 could also be used to define cavity 204. In fact, sometimes only one grating or coating can be used and the other end of gain fiber 202 can be cleaved to obtain Fresnel reflection from the cleaved surface. A person skilled in the art will appreciate how to process gain fiber 202 to establish cavity 204.

Gain fiber 202 is doped with gain material, as is known in the art. A saturable loss absorber 210 serving as passive Q-switch is spliced with gain fiber 202. Alternatively, saturable loss absorber 210 can be a segment of fiber doped with the saturable absorber material or it can even be a separate segment of fiber placed between the end of gain fiber 202 and mirror 208.

Figure 6A:
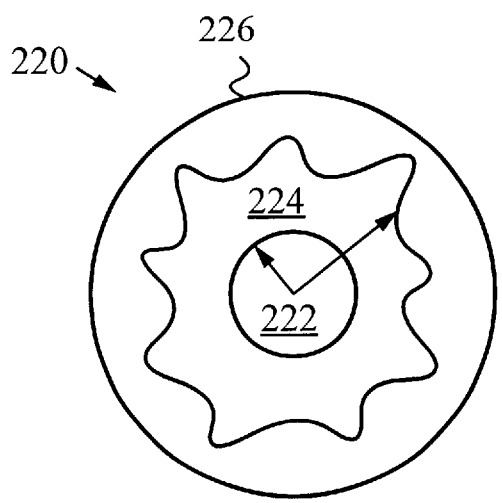
FIGS. 6A&B are cross sectional views of fiber amplifiers suitable for use in a solid state light source of the invention.

FIG. 6A illustrates in cross section a fiber amplifier 220 which can be used by light source 100 shown in FIG. 3. Fiber amplifier 220 has an active, circular core 222 surrounded by a cladding 224 with an irregular cross section. A protective outer cladding 226 surrounds cladding 224. Referring back to FIG. 3, pump light 130 is in-coupled into cladding 224, while beam 124 is in-coupled into core 222, as described above. Because of the irregular cross section of cladding 224, pump light 130 is more efficiently delivered to core 222 for amplifying beam 124. Thus, the length of fiber amplifier 220 can be kept short, e.g., 2 meters or less, as indicated above.

Figure 6B:
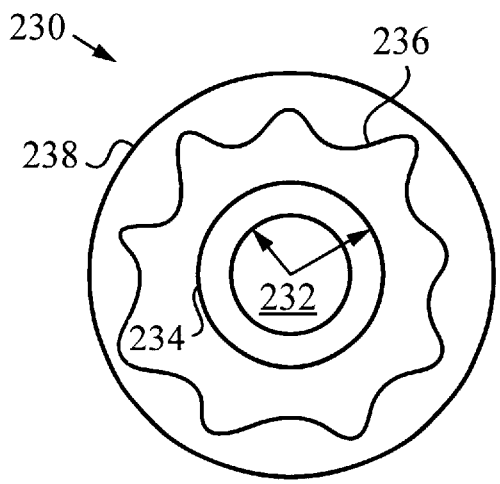

FIG. 6B illustrates yet another fiber amplifier 230 which can be used by light source 100. Fiber amplifier 230 has an active, circular core 232 surrounded by a first cladding 234. Cladding 234 has a circular cross section and is in turn surrounded by a second cladding 236 with an irregular cross section. Fiber amplifier 230 has a protective outer cladding 238. The addition of cladding 234 and adjustment of its index of refraction makes it possible for fiber amplifier 230 to alter the propagation characteristics of fiber amplifier 230 to improve the in-coupling of pump light 130 into core 232 and to improve the amplification efficiency. Once again, this enables one to keep the length of fiber amplifier 230 short. A person skilled in the art will recognize that the appropriate choice of fiber amplifier, its cross section, its length as well as pulse time $t_p$ and pulse energy are required to avoid fiber optic nonlinearities and especially those associated with stimulated Raman scattering as well as stimulated Brillouin scattering (SBS) and self phase modulation.

Figure 7:
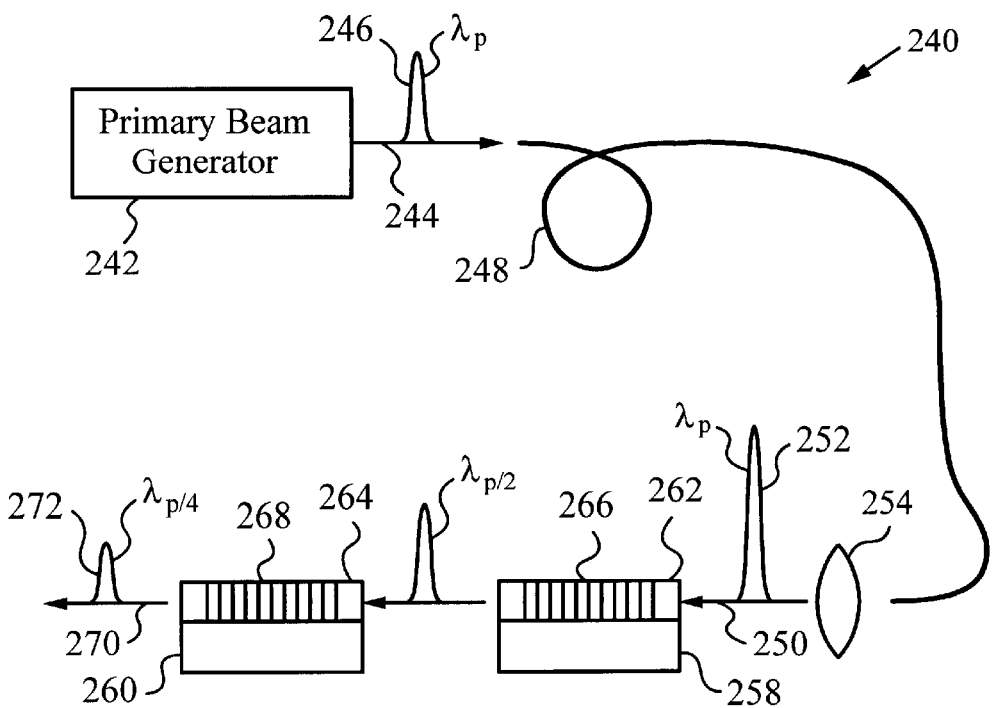
FIG. 7 is a diagram of another embodiment of a solid state light source.

Another embodiment of a light source 240 for use in system 101 is illustrated in FIG. 7. A primary beam generator 242 combines a pump source and a passively Q-switched laser and delivers a primary beam 244. Primary beam 244 consists of pulses 246 (only one indicated) of light at a wavelength $\lambda_p$ near 980 nm. Pulses 246 are formatted in accordance with the guidelines given above.

Primary beam 244 is delivered to a Yb doped fiber amplifier 248. Fiber amplifier 248 amplifies primary beam 244 to produce an intermediate beam 250 still at primary wavelength $\lambda_p$ near 980 nm. Intermediate beam 250 consists of pulses 252 (only one shown) which have a pulse duration, an inter-pulse separation and peak power defining a format calibrated to obtain at least 10% frequency conversion efficiency and preferably up to 50% or higher frequency conversion efficiency in two nonlinear elements 258, 260.

A lens 254 is placed in the path of intermediate beam 250 for directing it to nonlinear elements 258, 260. Nonlinear elements 258, 260 have waveguides 262, 264, e.g., in-diffused waveguides, with quasi-phase-matching (QPM) gratings 266, 268 disposed therein. Conveniently, nonlinear element 258 with QPM grating 266 is a PPLN, PPLT, PPKTP, MgO:LN or other poled structure. QPM grating 266 is designed for phasematching the second harmonic generation by which wavelength $\lambda_p$ is converted to the second harmonic at $\lambda_{p/2}$=490 nm. Nonlinear element 260 is made of a material which is transparent at 240–250 nm and in which QPM grating 268 can be formed. QPM grating 268 is designed for phasematching fourth harmonic generation by which second harmonic at $\lambda_{p/2}$ is converted to the fourth harmonic at $\lambda_{p/4}$=245 nm. An exposure beam 270 containing pulses 272 (only one shown) at $\lambda_{p/4}$ exits nonlinear element 260 and is delivered to the device for writing the fiber grating (or to another photolithographic application).

In an alternative embodiment, both frequency conversion processes, i.e., second harmonic generation and fourth harmonic generation can be performed in one QPM structure having appropriate grating sections to phasematch both operations. A person skilled in the art will realize that other cascaded frequency conversion processes can be implemented in nonlinear elements to derive an exposure beam in the UV wavelength range.

Figure 8:
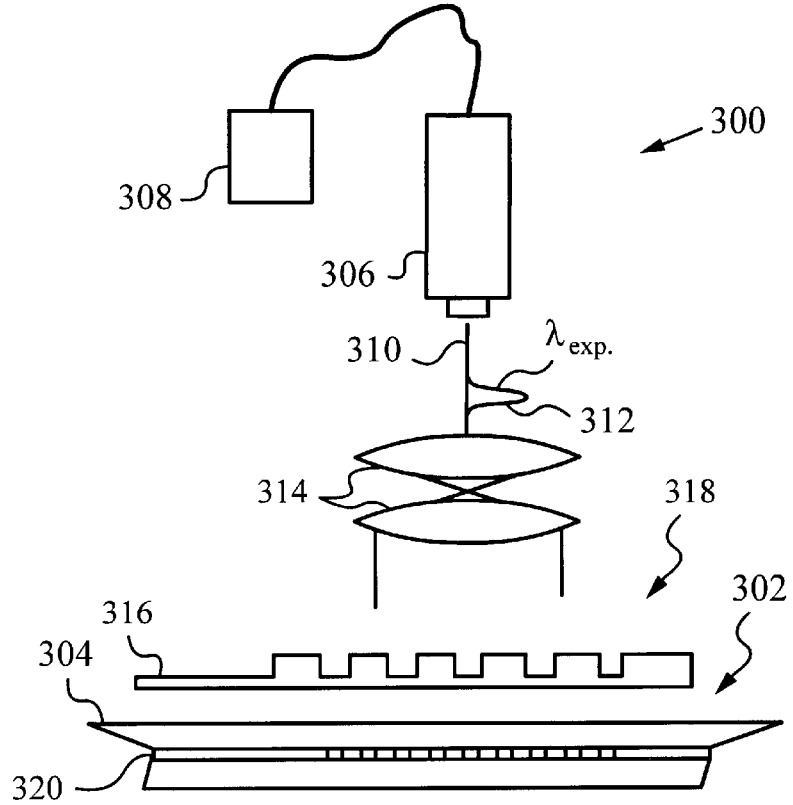
FIG. 8 is a system according to the invention for producing Bragg gratings in fibers.

FIG. 8 illustrates a system 300 for producing a Bragg grating 302 in a photosensitive silica fiber 304. System 300 employs a solid state light source 306 according to any one of the above-described embodiments. Light source 306 is controlled by a control mechanism 308. Light source 306 generates an exposure beam 310 containing pulses 312 of light at an exposure wavelength $\lambda_{exp.}$ corresponding to a photosensitive range of a core 320 of fiber 304. This range is contained in the UV wavelength range between 240 and 250 nm. In the present example, exposure wavelength $\lambda_{exp.}$ is 245 nm and average power is at least 500 milliWatts.

An optic 314, here in the form of a lens, is positioned to illuminate fiber 304 through a mask 316. Mask 316 has a grating pattern 318 for generating a fringe pattern in core 320 of fiber 304 from exposure beam 310. The fringe pattern corresponds to Bragg grating 302 to be produced in core 320 of fiber 304.

During operation system 300 is used to expose core 320 of fiber 304 through mask 316. Control mechanism 308 controls the duration of exposure and the power level of exposure beam 310 to remain within appropriate exposure parameters. In particular, such that there is sufficient power to form the grating but not enough to cause damage.

After exposure, fiber 304 is further processed in accordance to techniques well-known in the art. A person skilled in the art will realize that system 300 can utilize various portions of the UV wavelength range, e.g., depending on the exposure properties of the fiber or other work pieces, in case of other photolithographic applications. To cover other portions of the UV wavelength range wavelength $\lambda_p$ may be changed by selecting different gain media, e.g. Nd doped hosts, or different transitions of Yb in the same host. For example one can use the Yb:YAG transition at 1032 nm to obtain exposure wavelength $\lambda_{exp.}$ equal to the fourth harmonic at 257.5 nm. Still other gain media and transitions can be used to obtain other exposure wavelengths $\lambda_{exp.}$ in the UV wavelength range from 200 nm to 330 nm.

In particular, 3HG of the ~980 nm Yb transition results in ~327 nm UV light, which can be used to expose fiber Bragg gratings through the protective polymer, as well as for other photolithographic applications. Also, 3HG of the ~1064 nm transition of Nd (preferredly amplified in either Yb-fiber or Nd-fiber) results in 355 nm UV radiation, which is also of great practical interest.

A person skilled in the art will realize that any structures can be produced in a fiber using the solid state light source of the invention. For this reason, Bragg gratings in the sense of this invention include long period gratings and other periodic and non-periodic structures; for instance, angled Bragg gratings, chirped gratings, composite gratings, dispersion compensation gratings, and apodized Bragg gratings.

When fiber Bragg gratings are written using a point by point technique the fiber is typically scanned past a focused spot of the UV laser (or an image of some aperture). The UV laser is typically turned on and off in order to create exposed and non-exposed regions in the fiber, these regions with and without photoinduced refractive index changes, respectively. One difficulty with such point by point techniques is modulating the laser. The deep UV wavelengths preclude use of most types of optical modulators, as many acousto-optic and electro-optic materials do not transmit deep UV radiation well, or they do not withstand extended UV exposures without suffering from degradation. Furthermore, frequency doubled argon ion lasers and KrF excimer lasers do not offer simple means to directly modulate their optical outputs. The most common method for modulating the UV laser when using point by point techniques is with a mechanical shutter. It would be beneficial to have the capability of direct modualtion of the UV laser source, particularly with analog control over the UV output power. With the preferred embodiment, as shown in FIG. 3, it is simple to adjust the current driving the laser diodes, i.e., the current driving diode laser 128, which pumps fiber amplifier 104, thereby (electrically) modulating the peak (and average) power at the ≈980 nm wavelength, thereby controlling the average power at the 240–250 nm UV wavelength.

Hence, a desirable method of writing fiber Bragg gratings is to continuously scan the fiber past a focused spot from a UV laser, as described in the preferred embodiment, while electrically adjusting the diode current to correspond to the desired illumination pattern in the fiber.

Although the present invention and its advantages have been described in detail, it should be understood that various changes, substitutions, and alterations can be made herein without departing from the principle and the scope of the invention. Accordingly, the scope of the present invention should be determined by the following claims and their legal equivalents.

What is claimed is:

1. A solid state laser source for writing a Bragg grating in a fiber, said solid state laser source comprising a means for generating a pulsed exposure beam at an exposure wavelength in a UV wavelength range within a photosensitive range of a core of said fiber, said means further comprising a fiber amplifier for filtering and amplification.

2. The solid state laser source of claim 1 further comprising an arrangement for delivering said pulsed exposure beam to said fiber such that said Bragg grating is created in said core.

3. The solid state laser source of claim 1, wherein said exposure wavelength is between 240 and 250 nm.

4. The solid state laser source of claim 3, wherein said exposure wavelength is between 242 and 245 nm.

5. The solid state laser source of claim 1, wherein said means additionally comprise a passively Q-switched laser and at least one frequency conversion element.

6. The solid state laser source of claim 5, wherein said at least one frequency conversion element comprises two second harmonic generators set up in series for generating a fourth harmonic in a single pass.

7. The solid state laser source of claim 1, wherein said means further comprise a pulsed diode laser emitting at a wavelength substantially equal to 980 nm.

8. The solid state laser source of claim 7, wherein said fiber amplifier is a Yb doped fiber.

9. The solid state laser source of claim 1, wherein said means further comprise a Q-switched laser coupled into said fiber amplifier.

10. A solid state laser source for writing a Bragg grating in a fiber, said solid state laser source comprising:

a) a Yb doped element for emitting a beam at a wavelength substantially at 980 nm;

b) a fiber amplifier for filtering and amplification; and c) a fourth harmonic generator for converting said beam to an exposure beam at a wavelength between 240 and 250 nm for exposing a core of said fiber.

11. The solid state laser source of claim 10, wherein said fiber amplifier comprises a Yb doped fiber.

* * * * *

UNITED STATES PATENT AND TRADEMARK OFFICE
CERTIFICATE OF CORRECTION

PATENT NO. : 6,701,044 B2
DATED : March 2, 2004
INVENTOR(S) : Mark A. Arbore et al.

It is certified that error appears in the above-identified patent and that said Letters Patent is hereby corrected as shown below:

Column 1,
Line 13, please insert the following paragraph before "FIELD OF THE INVENTION"
-- STATEMENT REGARDING FEDERALLY SPONSORED RESEARCH OR DEVELOPMENT This invention was made with Government support under contract number F29601-99-C-0136 awarded by AFRL.

The Government has certain rights in the invention. --

Signed and Sealed this

First Day of February, 2005

JON W. DUDAS
*Director of the United States Patent and Trademark Office*